W. R. ELLIOT.
SALT AND PEPPER BOX.
APPLICATION FILED AUG. 5, 1919.

1,349,716.

Patented Aug. 17, 1920.
2 SHEETS—SHEET 1.

WITNESSES
Fred Frederick
A. L. Kitchin

INVENTOR
William Ritchie Elliot
BY Munn & Co
ATTORNEY

W. R. ELLIOT.
SALT AND PEPPER BOX.
APPLICATION FILED AUG. 5, 1919.
1,349,716.
Patented Aug. 17, 1920.
2 SHEETS—SHEET 2.
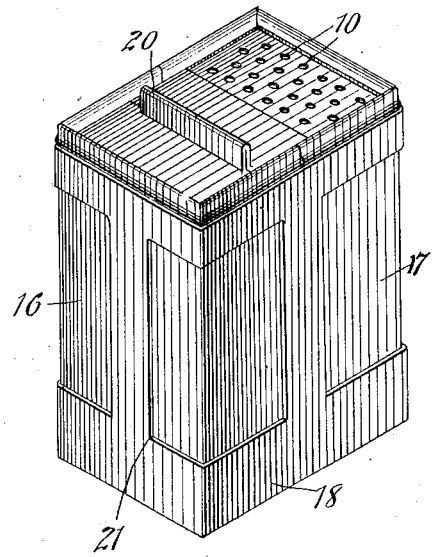
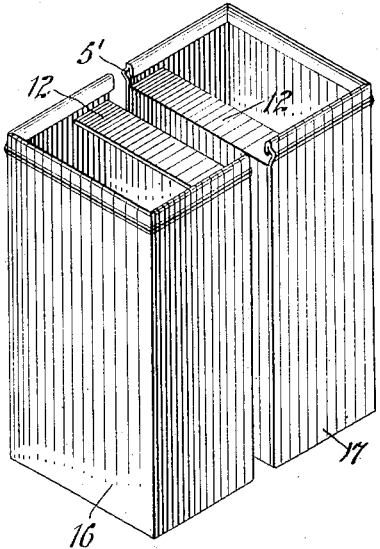
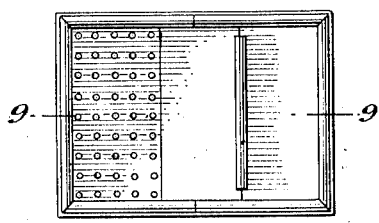
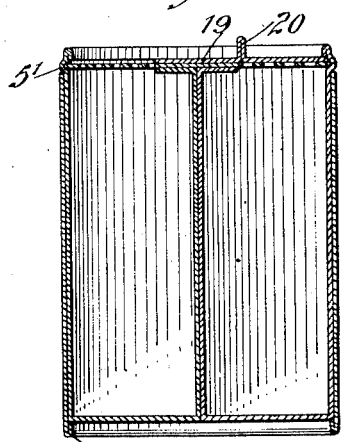
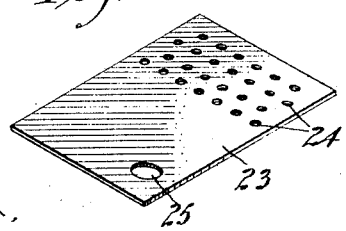
WITNESSES
Fred Frederick
A. L. Kitchin
INVENTOR
William Ritchie Elliot
BY Munn Co.
ATTORNEY

UNITED STATES PATENT OFFICE.

WILLIAM RITCHIE ELLIOT, OF RIVERHEAD, NEW YORK.

SALT AND PEPPER BOX.

1,349,716.

Specification of Letters Patent.  Patented Aug. 17, 1920.

Application filed August 5, 1919. Serial No. 315,493.

*To all whom it may concern:*

Be it known that I, WILLIAM RITCHIE ELLIOT, a citizen of the United States, and a resident of Riverhead, in the county of Suffolk and State of New York, have invented a new and useful Salt and Pepper Box, of which the following is a full, clear, and exact description.

This invention relates to salt and pepper boxes and has for an object to provide a construction wherein separate salt and pepper receptacles may be supported by a single holder and controlled by a single cover so that only one box will discharge at a time.

Another object is to provide a construction wherein the two boxes containing salt and pepper respectively are substantially duplicates with co-acting means for holding a single movable cover in place adapted to stop the flow from either box.

In the accompanying drawings:

Fig. 6 is a perspective view showing a modified form of holder and boxes to that disclosed in Fig. 1.

Fig. 7 is a top plan view of the construction shown in Fig. 6.

Fig. 8 is a perspective view of the boxes shown in Fig. 6.

Fig. 9 is a section through Fig. 7 on line 9—9.

Fig. 10 is a perspective view of a pouring and sifting plate embodying certain features of the invention.

Figure 1:
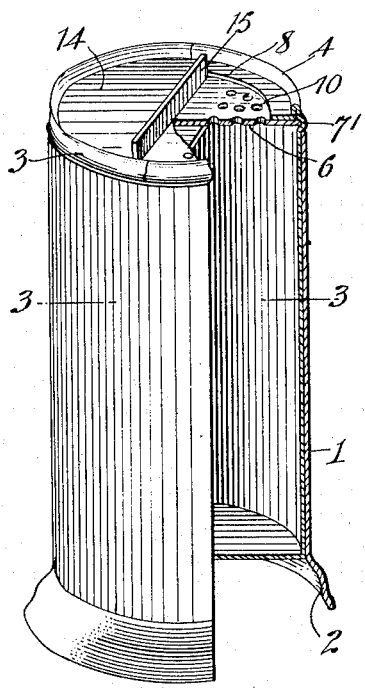
Figure 1 is a perspective view of a holder and a pair of boxes disclosing an embodiment of the invention, certain parts being broken away to better disclose the invention.
Figure 3:
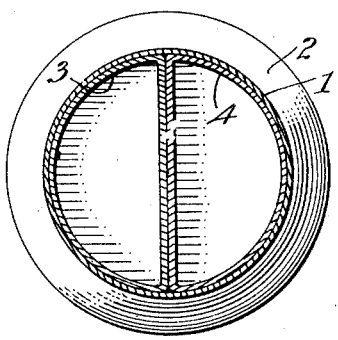
Fig. 3 is a transverse sectional view through Fig. 1 on line 3—3.
Figure 5:
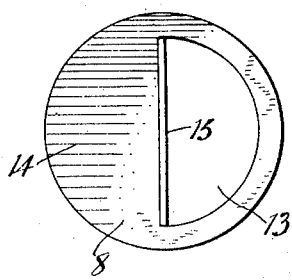
Fig. 5 is a plan view of a cover co-acting with the sifting disk shown in Fig. 4 for allowing the discharge of either salt or pepper, but not both at the same time.

Referring to the accompanying drawings by numerals 1 indicates a round holder formed with a base 2. This holder may be made from any suitable material, as for instance, metal, and is made up of such a length that the bottom of the boxes 3 and 4 will be substantially flush with the top of the base 2. The boxes are identical so that the description of one will apply to both. The box 4 is formed substantially tubular in cross-section, as shown in Fig. 3, and is provided with a pressed out groove 5 adjacent the top to receive the sifter or duster 6. The upper edge of the box is turned over at 7 to provide a stop for the cover 8 (Fig. 5), said cover being held in position thereby and by the disk 6 as shown in Fig. 1. The sifting disk or duster 6 is formed with small holes 9 for the box containing pepper and with large holes 10 for the box containing salt and with a central solid section 11 resting on the turned over flange supports 12. The cover 8 is a disk with a cut-out section 13, a solid section 14 and a turned up flange or hand-hold 15.

Figure 2:
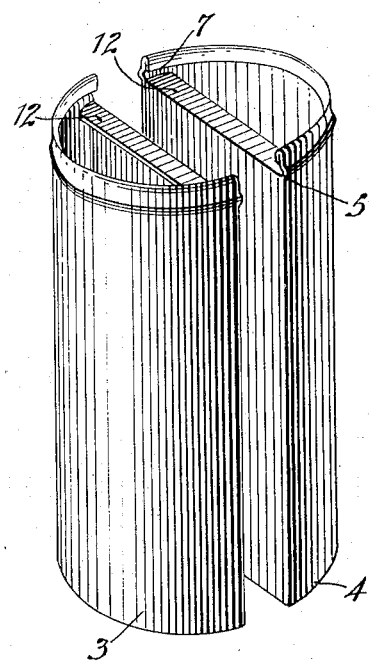
Fig. 2 is a perspective view of the boxes shown in Fig. 1.
Figure 4:
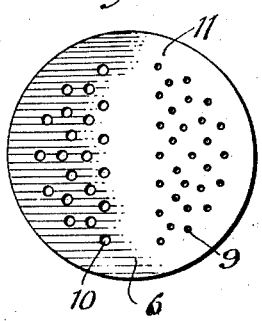
Fig. 4 is a plan view of a sifting disk embodying certain features of the invention.

To assemble the device the salt and pepper are first placed in the boxes 3 and 4 when removed as shown in Fig. 2, after which the sifter 6 and cover 8 respectively are placed in the groove 5 and beneath the flange 7. The assembled boxes are then placed in the holder 1 as shown in Fig. 1 and the device is ready for use. When salt is desired the cover 8 is turned to the position shown in Fig. 1 and the device inverted in the usual manner. When pepper is desired the hand-hold 15 is grasped and the cover 8 turned until the small holes 9 may be seen through the cut-out portion 13. The parts may be quickly and easily assembled and dis-assembled and the device may be freely used without danger of mixing the salt and pepper.

In Figs. 6 to 9 inclusive will be seen a slight modified form of the invention wherein the boxes 16 and 17 are substantially square in cross-section and the holder 18 is substantially rectangular. The construction is the same as the preferred form except for the shape of the parts and also except cover 19 is provided with a pressed-up hand-hold 20 and slides in the grooves 5' instead of rotating. The holder 18 is provided with cut-out portions 21 and with a turned-up edge or flange 22 which acts as a support for the boxes, instead of the bead 7' shown in Fig. 1.

In Fig. 10 will be seen a further modified form of sifter 23 provided with comparatively small holes 24 at one end, and a comparatively large pouring hole 25 at the opposite end.

What I claim is:

1. A salt and pepper shaker comprising a pair of identical boxes, each box having an open upper end provided with a groove adjacent the open end and a stop adjacent the groove, a holder for retaining the boxes juxtaposed, a single plate fitted into the grooves of both boxes, said plate having a series of openings for each box, and a cover having a cut-away section movably positioned between said plate and said stop for covering at different times the openings of each series so as to permit the discharge of one box at a time.

2. A salt and pepper shaker comprising a plurality of identical boxes, each box having an open upper end provided with a groove adjacent the upper end and a turned-over flange acting as a stop, said flange being positioned adjacent said groove, a holder for said boxes, means positioned in said groove having a series of openings for each box, and a single rotatable cover having its edges positioned between the means in said groove and said stop, said cover having a solid section covering all of said series of openings except one.

3. A salt and pepper shaker comprising a holder, a pair of boxes positioned in said holder formed with mating grooves and mating stops adjacent said grooves, a perforated plate positioned in said groove, some of the perforations being opposite each box, and a cover slidingly positioned between said plate and said stop, said cover closing the openings opposite one box while the other is discharging.

WM. RITCHIE ELLIOT.